United States Patent
Balijepalli et al.

(10) Patent No.: US 11,168,189 B2
(45) Date of Patent: Nov. 9, 2021

(54) STORAGE STABLE EPOXY PREPREGS FROM DICYANDIAMIDE SOLUTIONS AND METHODS FOR MAKING THE SAME

(71) Applicant: Dow Global Technologies LLC, Midland, MI (US)

(72) Inventors: Bharati Balijepalli, Midland, MI (US); David H. Bank, Midland, MI (US); Rajesh H. Turakhia, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 71 days.

(21) Appl. No.: 16/313,788

(22) PCT Filed: Jun. 9, 2017

(86) PCT No.: PCT/US2017/036791
§ 371 (c)(1),
(2) Date: Dec. 27, 2018

(87) PCT Pub. No.: WO2018/005045
PCT Pub. Date: Jan. 4, 2018

(65) Prior Publication Data
US 2020/0308356 A1    Oct. 1, 2020

Related U.S. Application Data

(60) Provisional application No. 62/355,011, filed on Jun. 27, 2016.

(51) Int. Cl.
| | |
|---|---|
| *C08J 5/24* | (2006.01) |
| *C08L 63/00* | (2006.01) |
| *C08G 59/50* | (2006.01) |
| *C08G 59/40* | (2006.01) |
| *C08G 59/18* | (2006.01) |
| *C08G 59/56* | (2006.01) |

(52) U.S. Cl.
CPC .............. *C08J 5/24* (2013.01); *C08G 59/184* (2013.01); *C08G 59/4021* (2013.01); *C08G 59/5026* (2013.01); *C08G 59/56* (2013.01); *C08L 63/00* (2013.01); *C08J 2363/02* (2013.01); *C08J 2463/04* (2013.01)

(58) Field of Classification Search
CPC ...... C08J 5/24; C08G 59/184; C08G 59/4021; C08G 59/5026; C08G 59/56; C08L 63/00–10
See application file for complete search history.

(56) References Cited

U.S. PATENT DOCUMENTS

| 4,621,128 A | 11/1986 | von Seyerl |
| 2015/0094400 A1 | 4/2015 | Zheng et al. |

FOREIGN PATENT DOCUMENTS

| EP | 1279688 A1 | 1/2003 |
| EP | 2180012 A1 | 4/2010 |
| WO | 2012/064662 A1 | 5/2012 |
| WO | 2016/087935 A1 | 6/2016 |

OTHER PUBLICATIONS

PCT/US2017/036791, International Search Report and Written Opinion with a dated Sep. 14, 2017.
PCT/US2017/036791, International Preliminary Report on Patentability with a dated Jan. 1, 2019.

*Primary Examiner* — Kregg T Brooks

(57) ABSTRACT

The present invention provides thermosetting resin pre-impregnated or infused fiber materials or prepregs comprising a fiber material of a heat resistant fiber, such as a continuous fiber material or a discontinuous chopped fiber mat, infused with a thermosetting resin mixture comprising (i) at least one liquid epoxy resin; (ii) at least one epoxy novolac resin, (iii) dicyandiamide and (iv) and an adduct of a cycloaliphatic amine and a liquid epoxy resin, wherein the dicyandiamide is dissolved in the adduct of a cycloaliphatic amine and a liquid epoxy resin. The prepreg or fiber material has a shelf life of at least 30 days at ambient temperature and pressure before its Initial Tg (DSC) rises above 40° C.

8 Claims, No Drawings

STORAGE STABLE EPOXY PREPREGS FROM DICYANDIAMIDE SOLUTIONS AND METHODS FOR MAKING THE SAME

The present invention relates to storage stable thermosetting resin pre-impregnated or infused fiber materials or prepregs comprising thermosetting epoxy resins and a dicyandiamide curing agent and an adduct of a cycloaliphatic amine and a liquid epoxy resin, and to methods for making them comprising infusing a fiber material, which can be continuous or not continuous, for example, a fabric of a carbon fiber or other heat resistant fiber, with a resin mixture of (i) one or more liquid epoxy resins and (ii) a solution of dicyandiamide in a hardener comprising a liquid epoxy resin adduct of a cycloaliphatic amine.

Carbon fiber composite articles, such as for automotive applications, are produced by the compression molding of thermosetting resin carbon fiber prepregs wherein dry carbon fiber fabrics are first infused with thermosetting resins, for example, epoxy resin and the resin is advanced to form prepregs that can be stored. For molding, the prepregs are cut to the desired size and multiple layers are stacked together for compression molding to form the final part. The prepregs are often manufactured for use by downstream users, such as an automotive original equipment manufacturer (OEM), and so must be able to withstand shipment to and storage by the OEM.

To meet the shelf stability requirement for prepregs, a latent curing agent such as dicyandiamide (dicy) is particularly suitable and cost-effective. Dicy is heat activated and cures rapidly with epoxy resins at temperatures of >145° C. in the presence of a catalyst, to yield highly cross linked networks exhibiting high strength and excellent mechanical properties. However, dicy is a crystalline solid that is poorly soluble in epoxy resin; during infusion of a continuous fiber fabric, dicy particles are retained and filtered out by the fiber mats at the point of entry of the resin. Thus, the dicy is not uniformly distributed in the prepreg fiber matrix. Composites made using such prepregs will have under-cured regions, and suffer from a lack of homogeneity and poor mechanical properties.

Previously, one way to solve the problem of fiber mats filtering dicy out of a thermosetting resin prepreg involved micronizing the dicy to nano-sized particles. Such methods can be tedious and expensive.

An easier way to overcome the filtration problem was to dissolve dicy in a solvent so that the thermosetting resin mixture became homogenous during infusion. Conventional solvents have been used; however, the use of organic solvents pose several disadvantages such as toxicity issues, addition of volatile organic content to formulations, the added difficulty of solvent removal, and the negative consequences which solvent will have on properties of the resulting composite.

Yet another option, disclosed in European Patent publication EP2180012 A1, to Hexion Specialty Chemicals Research (Hexion), has been to use liquid or fluid amines to solubilize the dicy. This approach could enable infusion of thermosetting resins at much lower temperatures than in prior methods; and the amines could be left in the prepreg prior to forming a composite from the prepreg. According to Hexion, the amine solution of dicy would remain stable at least until infusion was complete. Unfortunately, in the known methods for dissolving dicy in an amine, the amine has to be fluid in use and so only a limited amount of dicy (up to 21 wt. %, based on the weight of the amine) can be used without initiating crystallization of the dicy.

A critical requirement for a prepreg or infused fiber material for use in automotive applications is a cured glass transition temperature (Cured Tg) higher than the cure temperature when cured for 2 minutes at ~150° C., while limiting the initial glass transition temperature (Initial Tg) of the prepreg to less than 40° C. in order to avoid gelation of the matrix resin. A Cured Tg>150° C. allows a part compression molded at around 150° C. to be released while still hot without warping. The resulting parts also have improved heat resistance, less creep and dimensional stability at the temperatures used for automobile manufacture and operation. To satisfy the need for the high Cured Tg and Initial Tg of less than 40° C., more dicy is needed in composites made from prepregs or infused fiber materials containing dicy than are enabled in the art, such as Hexion. Thus, the ordinary skilled artisan remains faced with the old dicy filtration problem.

The present inventors have sought to solve the problem providing shelf stable, ductile thermosetting resin prepregs or resin infused fiber materials containing homogeneously dispersed dicyandiamide in amounts greater than amounts found in the art and to enable the making of the fiber materials, as well as composites having excellent mechanical properties from the fiber materials.

STATEMENT OF THE INVENTION

In accordance with the present invention, thermosetting resin pre-impregnated or infused fiber materials or prepregs comprise a fiber material, such as one containing a continuous fiber, woven mat, chopped or recycled fiber, preferably, of a heat resistant fiber, such as carbon fiber, infused with a thermosetting resin mixture comprising (i) at least one liquid epoxy resin, (ii) at least one epoxy novolac resin; (iii) dicyandiamide, and (iv) and an adduct of a cycloaliphatic amine and a liquid epoxy resin, wherein the dicyandiamide is dissolved in the adduct of a cycloaliphatic amine and a liquid epoxy resin.

1. In accordance with the present invention, thermosetting resin pre-impregnated or infused fiber materials or prepregs comprise a fiber material, such as a continuous fiber, a woven mat, or chopped or recycled fibers, preferably, a fiber material of a heat resistant fiber, such as carbon fiber, infused with a thermosetting resin mixture comprising (i) at least one liquid epoxy resin, (ii) at least one epoxy novolac resin, (iii) dicyandiamide and (iv) and an adduct of a cycloaliphatic amine and a liquid epoxy resin, wherein the dicyandiamide is dissolved in the adduct of a cycloaliphatic amine and a liquid epoxy resin, and having a differential scanning calorimetry (DSC) initial glass transition temperature (Initial Tg or Tg1) of 40° C. or below, wherein the ratio of amine hydrogen equivalents in the (iv) adduct of a cycloaliphatic amine and a liquid epoxy resin to the epoxy group equivalents in the (i) at least one epoxy resin and the (ii) at least one epoxy novolac resin ranges from 0.25:1 to 0.45:1, or, preferably, 0.40:1 or less, further wherein the ratio of amine hydrogen equivalents of the (iii) dicyandiamide to the epoxy group equivalents in the (i) at least one epoxy resin and the (ii) at least one epoxy novolac resin ranges from 0.20:1 to 0.75:1 or, preferably, from 0.20:1 to 0.60:1

2. In accordance with the thermosetting resin pre-impregnated or infused fiber materials or prepregs of the present invention as in item 1, wherein the fiber material or prepreg has a shelf life of at least 30 days at ambient temperature and pressure before its Initial Tg rises above 40° C.

3. In accordance with the thermosetting resin pre-impregnated or infused fiber materials or prepregs of the present invention as in any one of items 1 or 2 of, wherein the fiber materials or prepregs further comprise a catalyst, such as an alkylaryl or phenyl substituted urea, for example, 3-phenyl-1,1-dimethylurea, 3-(3,4-dichlorophenyl)-1,1-dimethylurea) (DCMU), 3-(3-chloro-4-methylphenyl)-1,1-dimethylurea, and toluene bis-dimethyl urea, preferably, toluene bis dimethyl urea. The catalyst may be used in amounts of from 1 to 8 phr, preferably from 1.5 to 5.5 phr, and wherein after curing for 2 minutes at 150° C., or after for 3 minutes at 150° C., the resulting material has a Cured Tg of 150° C. or greater.

4. In accordance with the thermosetting resin pre-impregnated or infused fiber materials or prepregs of the present invention as in any of items 1, 2, or 3, above, wherein the (i) at least one liquid epoxy resin comprises bisphenol A or F diglycidyl ether epoxy resins.

5. In accordance with the thermosetting resin pre-impregnated or infused fiber materials or prepregs of the present invention as in any of items 1, 2, 3, or 4, above, wherein the (i) at least one liquid epoxy resin (neat) has a viscosity (ASTM D445, Kinematic viscosity, 2006) of from 500 to 15,000 mPa·s at 25° C. or, preferably, from 1000 to 11,000 mPa·s at 25° C.

6. In accordance with the thermosetting resin pre-impregnated or infused fiber materials or prepregs of the present invention as in any of items 1, 2, 3, 4, or 5, above, wherein the fiber material comprises a heat resistant fiber chosen from carbon fiber, glass fiber, ceramic fiber, acrylonitrile fibers, aramid fibers, or their admixtures.

7. In accordance with the thermosetting resin pre-impregnated or infused fiber materials or prepregs of the present invention as in any of items 1, 2, 3, 4, 5, or 6, above, wherein the (iv) adduct of a cycloaliphatic amine and a liquid epoxy resin comprises the adduct of the liquid epoxy resin and a cycloaliphatic amine chosen from a mixture of 4-methylcyclohexane-1,3-diamine and 2-methylcyclohexane-1,3-diamine (MDACH); 4-methylcyclohexane-1,3-diamine; 2-methylcyclohexane-1,3-diamine; aminoethyl piperazine (AEP); 1,2-diaminocyclohexane; 1,3-diaminocyclohexane; 1,4-diaminocyclohexane; 1,3-bis(aminomethyl)cyclohexane (1,3-BAC); isophorone diamine (IPDA); norbornane diamines, 3,3'-dimethyl-4,4"-diaminodicyclohexyl methane; di(aminocyclohexyl)methane; 1,3-di(aminocyclohexyl)propane; 1-cyclohexylamino-3-aminopropane; di(aminocyclohexyl)sulfone; and combinations thereof, preferably, a mixture of 4-methylcyclohexane-1,3-diamine and 2-methylcyclohexane-1,3-diamine (MDACH).

8. In accordance with the thermosetting resin pre-impregnated or infused fiber materials or prepregs of the present invention as in any of items 1, 2, 3, 4, 5, 6, or 7, above, wherein the weight ratio, as solids, of the total amount of the (ii) at least one epoxy novolac resin to the total amount of the (i) at least one liquid epoxy resin ranges from 5 to 30 wt. %, or, preferably, from 15 to 25 wt. %.

9. In accordance with another aspect of the present invention, methods for making thermosetting resin pre-impregnated or infused fiber materials or prepregs comprise infusing at ambient temperature a fiber material, such as a continuous fiber, a woven mat, or chopped or recycled fibers, preferably, a fiber material of a heat resistant fiber, such as carbon fiber, with a thermosetting resin mixture of (i) at least one liquid epoxy resin; (ii) at least one epoxy novolac resin and a solution of (iii) dicyandiamide in (iv) an adduct of a cycloaliphatic amine and a liquid epoxy resin and having a differential scanning calorimetry (DSC) initial glass transition temperature (Initial Tg) of 40° C. or below, wherein the ratio of amine hydrogen equivalents in the (iv) adduct of a cycloaliphatic amine and a liquid epoxy resin to the epoxy group equivalents in the (i) at least one epoxy resin and the (ii) at least one epoxy novolac resin ranges from 0.25:1 to 0.45:1, or, preferably, 0.40:1 or less, further wherein the ratio of amine hydrogen equivalents of the (iii) dicyandiamide to the epoxy group equivalents in the (i) at least one epoxy resin and the (ii) at least one epoxy novolac resin ranges from 0.20:1 to 0.75:1 or, preferably, from 0.20:1 to 0.60:1, and then B-staging the resulting material by heating it at a temperature of from 80 to 110° C. or, preferably, from 85 to 100° C. for a period of 30 seconds to 4 minutes or, preferably, from 45 seconds to 3 minutes to advance the Initial Tg of the prepreg to a temperature of 40° C. or below.

10. In accordance with the methods of the present invention for making resin infused fiber materials or prepregs as in item 9, above, wherein the infusing comprises providing a carrier sheet having a backing layer, such as a releasing paper, having on it a film of the thermosetting resin mixture for example, by spraying, pouring or drawing the thermosetting resin mixture onto the backing layer; contacting the film of thermosetting resin mixture on one or more carrier sheets with the fiber material, such as a fiber material sheet, mat, or collection of fibers, to form a thermosetting resin fiber material mass enclosed in one or more backing layers, such as sandwiched between two carrier sheets or wrapped within a single carrier sheet, and wherein B-staging comprises heat pressing the thermosetting resin fiber material mass.

11. In accordance with the methods of the present invention for making resin infused fiber materials or prepregs as in any one of items 9 or 10, above, wherein the B-staging comprises heating the thermosetting resin fiber material mass using oil-heated compaction rollers and a heated table or a heated press.

12. In accordance with the methods of the present invention for making resin infused fiber materials or prepregs as in any one of items 9, 10 or 11, above, wherein the fiber materials or prepregs further comprise a catalyst, such as an alkylaryl or phenyl substituted urea, for example, 3-phenyl-1,1-dimethylurea, 3-(3,4-dichlorophenyl)-1,1-dimethylurea) (DCMU), 3-(3-chloro-4-methylphenyl)-1,1-dimethylurea, and toluene bis-dimethyl urea, preferably, toluene bis dimethyl urea the catalyst may be used in amounts of from 1 to 8 phr, preferably from 1.5 to 5.5 phr, and wherein after curing for 2 minutes at 150° C., or after curing for 3 minutes at 150° C., the resulting material has a Cured Tg of 150° C. or greater.

13. In accordance with methods of the present invention for making resin infused fiber materials or prepregs as in any of items 9, 10, 11, or 12, above, wherein the (i) at least one liquid epoxy resin comprises bisphenol A or F diglycidyl ether epoxy resins.

14. In accordance with the methods of the present invention for making resin infused fiber materials or prepregs as in any one of items 9, 10, 11, 12 or 13, above, wherein the (i) at least one liquid epoxy resin has a viscosity (ASTM D445, Kinematic viscosity, 2006) of from 500 to 15,000 mPa·s at room temperature or, preferably, from 1000 to 11,000 mPa·s at room temperature.

15. In accordance with the methods of the present invention for making resin infused fiber materials or prepregs as in any one of items 9, 10, 11, 12, 13 or 14, above, wherein the fiber material comprises a heat resistant fiber chosen from carbon fiber, glass fiber, ceramic fiber, acrylonitrile fibers, aramid fibers, or their admixtures.

16. In accordance with the methods of the present invention for making resin infused fiber materials or prepregs as in any one of items 9, 10, 11, 12, 13, 14, or 15, above, wherein the (iii) adduct of a cycloaliphatic amine and a liquid epoxy resin comprises the adduct of the liquid epoxy resin and a cycloaliphatic amine chosen from a mixture of 4-methylcyclohexane-1,3-diamine and 2-methylcyclohexane-1,3-diamine (MDACH); 4-methylcyclohexane-1,3-diamine; 2-methylcyclohexane-1,3-diamine; aminoethyl piperazine (AEP); 1,2-diaminocyclohexane; 1,3-diaminocyclohexane; 1,4-diaminocyclohexane; 1,3-bis(aminomethyl)cyclohexane (1,3-BAC); isophorone diamine (IPDA); norbornane diamines, 3,3'-dimethyl-4,4"-diaminodicyclohexyl methane; di(aminocyclohexyl)methane; 1,3-di(aminocyclohexyl)propane; 1-cyclohexylamino-3-aminopropane; di(aminocyclohexyl)sulfone; and combinations thereof, preferably, a mixture of 4-methylcyclohexane-1,3-diamine and 2-methylcyclohexane-1,3-diamine (MDACH).

17. In accordance with the methods of the present invention for making resin infused fiber materials or prepregs as in any one of items 9, 10, 11, 12, 13, 14, 15, or 16, above, wherein the weight ratio, as solids, of the total amount of the (ii) at least one epoxy novolac resin to the total amount of the (i) at least one liquid epoxy resin ranges from 5 to 30 wt. %, or, preferably, from 15 to 25 wt. %.

18. In accordance with the methods of the present invention for making resin infused fiber materials or prepregs as in any one of items 9, 10, 11, 12, 13, 14, 15, 16, 17, above, further comprising compression molding one or more prepregs to make a cured composite material.

Unless otherwise indicated, conditions of temperature and pressure are ambient temperature and standard pressure.

Room temperature means a temperature of from 22-23° C.

All ranges recited are inclusive and combinable.

Unless otherwise indicated, any term containing parentheses refers, alternatively, to the whole term as if no parentheses were present and the term without them, and combinations of each alternative. Thus, the term "(poly)alkoxy" refers to alkoxy, polyalkoxy, or mixtures thereof.

Unless otherwise indicated, all materials are used neat, without solvents, diluents or carriers and contain a total of less than 0.2 wt. % of impurities.

All ranges are inclusive and combinable. For example, the term "a range of 50 to 3000 cPs, or 100 or more cPs" would include each of 50 to 100 cPs, 50 to 3000 cPs and 100 to 3000 cPs.

As used herein, unless otherwise indicated, the term "amine hydrogen equivalent weight" or ANEW means the amount in grams of an amine that yields one molar equivalent of hydrogen in reaction as measured by titration using ASTM D 2074-07 (2007).

As used herein, the term "ASTM" refers to the publications of ASTM International, West Conshohocken, Pa.

As used herein, the term "composite" means a cured material containing a matrix of one or more thermosetting resins and dispersed in the matrix one or more heat resistant fiber compositions.

As used herein, the term "EEW" or "epoxy equivalent weight" means the amount determined using a Metrohm 801 Robotic USB sample processor XL and two 800 Dosino™ dosing devices for the reagents (Metrohm USA, Tampa, Fla.). The reagents used are perchloric acid in acetic acid 0.10 N and tetraethylammonium bromide. The electrode for the analysis is an 854 Iconnect™ electrode (Metrohm). For each sample, 1 g of dispersion is weighed out into a plastic sample cup. Then 30 mL of THF (tetrahydrofuran) is first added and mixed for 1 minute (min) to break the shell on the dispersion. Next, 32 mL of glacial acetic acid is added and mixed for another 1 min to fully dissolve the sample. The sample is then placed on the auto sampler and all relevant data (e.g., sample ID, sample weight) is added to the software. From here the start button is clicked to start the titration. Thereafter, 15 mL of tetraethylammonium bromide is added, and then the perchloric acid is slowly added until a potentiometric endpoint is reached. Once the potentiometric endpoint is reached, the software calculates an EEW value based on the amount of sample and perchloric acid used. In a mixture of epoxy resins, the EEW is a weight average of the EEWs for each epoxy resin in the mixture. For example, a 50/50 (w/w) mixture of an epoxy resin having an EEW of 500 and one having an EEW of 200 is 350.

As used herein, unless otherwise indicated, the term "glass transition temperature" or "Tg" means the temperature determined by differential scanning calorimetry (DSC; Q2000, TA Instruments, New Castle, Del.). Approximately 5 mg of a given neat thermosetting resin mixture or prepreg specimens were heated at a rate of 10° C. min$^{-1}$ from −20° C. to 280° C., the first heat ramp. The resin or prepreg (Initial Tg or Tg1) glass transition temperatures were determined as the mid-point or inflection in the plateau in temperature transition curve generated in first heat ramp. The specimens were then quenched to −20° C. A second heating ramp of 10° C. min$^{-1}$ rising to 280° C. was applied. Unless otherwise indicated, the cured glass transition temperature (Cured Tg or Tg2) of a given thermosetting resin mixture was determined as the mid-point in the plateau of the second temperature transition curve.

As used herein, the term "Tg1" or "Initial Tg" refers to an initial glass transition temperature or Initial Tg of a given prepreg material by DSC immediately after B-staging.

As used herein, the term "phr" means per hundred weight parts resin.

As used herein, the term "solid" refers to the state of a given material below its glass transition temperature.

As used herein, unless otherwise indicated, the term "solids content" refers to the total weight of epoxy resins, hardeners, catalysts or accelerators, and other non-volatile materials, such as pigments, silicones and non-volatile additives that remain after cure, expressed as a total wt. % of the composition, regardless of their state as liquids, gases or solids. Solids exclude solvents, such as xylene, and non-reactive diluents, such as, for example, plasticizers like butyl adipates.

As used herein, the term "shelf life" refers to the time during which a prepreg stored at ambient temperature and pressure retains a DSC Tg of 40° C. or less.

As used herein, the term "thermosetting" means a resin containing material that cures or crosslinks upon exposure to heat; and the term "thermoset" refers to a heat cured or crosslinked resin containing material.

As used herein, the abbreviation "wt. %" stands for weight percent.

The present inventors have discovered that in resin infused fiber materials or prepreg materials containing dicyandiamide dissolved in epoxy-amine adducts of cycloaliphatic amines, more dicyandiamide could be included. Therefore, the amount of amine used in the prepreg materials could be reduced, making the resulting prepreg materials more shelf stable. The epoxy-amine adducts of cycloaliphatic amine according to the present invention possess the ability to dissolve not only greater amounts (at least 21 to 30 wt. %, or, preferably, 22 to 30 wt. %, based on the weight of any amine used) of dicyandiamide but also keep the dicy in solution in the presence of the other components of the epoxy resin mixture, such as the epoxy resin. This prevents crystal separation taking place before or during the infusion process to impregnate a carbon fiber fabric. The resulting prepreg or infused fiber materials had lower prepreg glass transition temperatures (Tgs), making them more ductile and easier to handle. The flexibility and lower Tg of the resulting prepreg or infused fiber materials allows greater choice of amines within a useful formulation. In addition, the resulting prepreg or infused fiber materials produce composites having higher Cured Tgs after a 2 minute cure at 150° C. Additionally, the epoxy amine adducts possess a slightly higher viscosity compared to the corresponding cycloaliphatic amines that helps improve mixing of the hardener (including the epoxy amine adduct solution of dicyandiamide) with the liquid epoxy resins (LER) and blends of LER and epoxy novolac resins.

The Tg of resin infused fiber materials or prepreg materials in accordance with the present invention ranges from 10 to 40° C. for a shelf life period of 30 days or more, for example, 30 to 45 days at ambient temperature. Such a stable prepreg material avoids gelation of the thermosetting resin mixture and allows for easier handling of the prepreg. The prepreg or infused fiber material Tg below 40° C. is achieved by using epoxy cycloaliphatic amine adducts as the dissolving agents for dicyandiamide. In general, for every 1 equivalent of epoxy functionality, 0.45:1 equivalents or less of amine should be used, or else the Tg of the prepreg or infused fiber material will advance beyond 40° C. The less amine that is used, the lower the prepreg or infused fiber material Tg will be. Preferably, the curative mixture consists of less than or equal to 0.4:1 equivalents of amine to equivalents of epoxy.

The resin infused fiber materials or prepreg materials of the present invention provide a composite article having final cured Cured Tg of ≥150° C. after a 2 minute cure at 150° C. To accomplish such a result, the prepreg materials comprise (iii) epoxy resin adducts of cycloaliphatic amines. Linear aliphatic polyamines cannot meet this Cured Tg requirement; whereas aromatic amines require an additional catalyst to react in the B-staging conditions of the present invention, for example, a calendering process, set of heated rollers or a nip in which the thermosetting resin mixture is sandwiched within two or more layers of fabric fiber material for from 30 seconds to 4 minutes at from 80 to 110° C. This additional catalyst could adversely affect the cure kinetics of the thermosetting resin.

The resin infused fiber materials or prepreg materials of the present invention can comprise one or more catalysts that react when the prepreg materials are cured to form a composite article. Furthermore, the catalyst should be soluble in the one or more epoxy resins to prevent initiation of crystallization of the dissolved dicyandiamide. Suitable catalysts are substituted ureas, like toluene bis-dimethyl urea (TBDMU). When catalysts like TBDMU were pre-dissolved in epoxy resin, no crystallization of dicyandiamide was observed during infusion.

In the resin infused fiber materials or prepreg materials of the present invention, the (i) liquid epoxy resins can be any compound which contains, on average, more than one epoxy moiety per molecule, or a mixture of such epoxy resin compounds, and which have the desired viscosity or which are liquid at infusing temperatures. Suitable polyepoxides (polyglycidyl ethers of a polyol, such as, for example, a polynuclear phenol) may be prepared by reacting an epihalohydrin with an aromatic polyol, polynuclear phenol, aliphatic polyol, or a halogenated polyol. The preparation of such compounds is well known in the art. See Kirk-Othmer Encyclopedia of Chemical Technology 3rd Ed. Vol. 9 pp 267-289 (incorporated herein by reference).

Preferred polyols for making epoxy resins are the bisphenols and other polynuclear phenols, as well as polyalkylene glycols.

Examples of suitable epoxy resins for use in the thermosetting resin mixture of the present invention may comprise conventional epoxy resins which have the desired viscosity or are liquid at infusing temperatures, such as bisphenol A or F epoxy resins, phenolic epoxy resins, polyphenolic epoxy resins, novolac epoxy resins and cresol epoxy resins having an epoxy equivalent weight (EEW) of 250 or below, as well as mixtures thereof, for example, mixtures of bisphenol epoxy resins and novolac epoxy resins.

Preferably, the epoxy resins used in the present invention are linear or difunctional glycidyl ethers of polyols, chosen from epoxy resins having an epoxy equivalent weight of from 150 to 250 or, preferably, below 200.

The stoichiometric ratio of the amine hydrogen equivalents of the (iii) dicyandiamide to the epoxy resin and epoxy novolac resin in the thermosetting resin mixture of the present invention may range from 0.2:1 to 0.75:1, or, preferably, from 0.2:1 to 0.6:1.

The (iv) epoxy-amine adducts of cycloaliphatic amine of the present invention can be formed by mixing an excess amount of the amine as amine hydrogen equivalents and the epoxy (as epoxy group equivalents), for example, from 2:1 to 12:1, or, from 5:1 to 10:1 amine hydrogen equivalents to epoxy group equivalents and heating to react them. Adduct formation can be confirmed by disappearance of the epoxy peak (at about 915 $cm^{-1}$) by FTIR spectroscopy.

Composites made in accordance with the invention may have fiber contents of at least 50 wt. %, and up to 90 wt. %.

Suitable heat resistant fibers for use in the resin infused fiber materials or prepreg materials of the present invention are those fibers that are thermally stable and have a melting temperature such that the reinforcing fibers do not degrade or melt during the curing process. Suitable fiber materials include, for example, carbon, glass, quartz, polyaramid, boron, carbon, wheat straw, hemp, sisal, cotton, bamboo and gel-spun polyethylene fibers.

The resin infused fiber materials or prepreg materials of the present invention may further comprise one or more impact modifiers or tougheners, internal mold release agents, reactive diluents, coalescents, pigments; tackifiers, antioxidants or wetting agents, preferably, internal mold release agents.

The thermosetting resin mixture of the present invention may contain an internal mold release agent. Such an internal mold release agent may constitute up to 5 wt. %, or, preferably, up to 3 wt. % of the total thermosetting resin mixture. Suitable internal mold release agents are well known and commercially available, including fatty acids, fatty acid esters, fatty acid salts, long chain acrylates, amide waxes, and mixtures of fatty acids, amines and esters. Waxes such as zinc stearate, stearyl acrylate and Montan acid esters are particularly suitable. With regard to the montanic acid esters, montanic acid esterification products obtained by subjecting montanic acid and diol compounds, such as ethylene glycol and butylene glycol, or triol compounds such as glycerin, to a dehydration condensation reaction are preferred. These are commercially available as LICOWAX E and LICOLUB WE4 (Clariant International AG, Muttenz, CH).

In accordance with the infused fiber or prepreg materials of the present invention, the materials comprise a backing layer or a release layer, such as wax paper or an organosiloxane coated backing layer or release layer. The infused fiber or prepreg materials may also be sandwiched between two backing layers and may be individually stacked and stored.

In accordance with the methods of making resin infused fiber materials or prepreg materials of the present invention, infusing a thermosetting resin mixture comprises flowing the thermosetting resin mixture into the fiber materials of the present invention. Infusing to flow a fluid resin mixture and wet out the fiber materials generally takes from 5 to 60 minutes, and is followed by B-staging. Most amines will start reacting with epoxy resins at room temperature soon after mixing to form a resin mixture. As the amine is consumed, after a certain point the dicyandiamide will start to precipitate out. Therefore the reaction of the amine and the epoxy resin should be slow enough that the dicyandiamide stays in solution until infusion is complete. For this reason, among others, the epoxy-amine adducts of the present invention comprise epoxy resin adducts of cycloaliphatic amines.

Composites in accordance with the present invention may be formed by introducing the resin infused fiber materials or prepreg materials into a compression mold and curing.

In compression molding in accordance with the present invention, one or more resin infused fiber materials or prepreg materials is arranged around a male mold or pattern and is introduced into a female mold or open mold or is arranged within a female mold or pattern, followed by closing the open mold or female mold. The mold may be preheated. The curing temperature may be, for example, from 60 to 180° C., for example, from 80 to 160° C., or, preferably 100 to 160° C., or especially preferably, 130 to 160° C.

Suitable compression molding pressures range from 6,000 to 30,000 kPa (60 to 300 bar) or, preferably, from 10,000 to 20,000 kPa.

Preferably, curing is continued for from 120 to 600 seconds or less, or, preferably, from 120 to 360 seconds or less, or, more preferably, 240 seconds or less.

Any mold surface may be treated with an external mold release agent, which may contain solvent or water.

The resin infused fiber materials or prepreg materials, including any male pattern or mold, may be enclosed in a bag or film such as is commonly used in vacuum assisted compressing molding processes.

The methods of the present invention can be used to make a wide variety of composite products where fiber reinforced plastics appear, including various types of automotive or other transportation parts, housings for appliances and electronics goods, and sporting goods, such as tennis rackets.

EXAMPLES

The following examples are used to illustrate the present invention without limiting it to those examples. Unless otherwise indicated, all temperatures are ambient temperatures and all pressures are 101 kPa (1 atmosphere).

The following materials and chemicals were used in the Examples that follow:

Baxxodur™ ECX 210: A mixture of 4-methylcyclohexane-1,3-diamine and 2-methylcyclohexane-1,3-diamine (MDACH), AHEW 32 g, BASF, Florham Park, N.J.;

Carbon fiber (12K fibers/tow, A42-D012, DowAksa, Turkey); and

NCF: Non Crimp Fabric of carbon fiber (590 g/m²)

TABLE 1

Example 1 Formulation

| Name | Description |
| --- | --- |
| Epoxy Resin 1 | Liquid epoxy resin of a diglycidyl ether of Bis-phenol A (EEW 176-182 g) |
| Epoxy Resin 2 | Liquid epoxy Novolac resin (EEW 175-181 g) |
| Technicure ™ nano Dicy | Dicyandiamide (A&C Catalysts Linden, NJ, AHEW 21 g) |
| MDACH - Epoxy Resin 1 adduct | (AHEW 37.6) |
| Urea Catalyst | Omicure ™ U410 Toluene bis-Dimethyl Urea (TBDMU, CVC Thermosets, Moorestown, NJ) |

Example 1A

Synthesis of Epoxy-Amine Adduct from Tables 1 and 2

Calculated amounts of cycloaliphatic amine and epoxy resin 1 (9:1 molar ratio of amine groups to epoxy groups) were weighed into a three necked round bottomed flask equipped with a magnetic stir bar, a thermometer and a nitrogen gas inlet. The flask was placed into a heating mantle. The mixture was stirred at 80° C. for 3 hours. The disappearance of epoxy functionality was confirmed using FTIR spectroscopy, peak at 915 cm$^{-1}$ Example 1B Formation of Thermosetting Resin Mixture from Table 2

A hardener mixture was prepared first by weighing the amounts of amine adduct and dicyandiamide indicated in Table 1, above, into a speedmixer. The cup was then inserted into a dual asymmetric centrifugal FlackTek™ speedmixer (FlackTek Inc., Landrum, S.C.) and the contents were mixed for 2 minutes at 2000 rpm. Mixing was repeated in 2 minute cycles until the dicyandiamide dissolved completely and the solution became clear. Next, the thermosetting resin mixture of epoxy resins and the hardener mixture in the amounts indicated in Table 1, above, were weighed into a separate speed mixer cup and blended in the speedmixer by adding the hardener to the epoxy resin an mixing for 2 minute at 2000 rpm.

Example 2

Laboratory Infusion of Carbon Fiber Fabric

Lab infusion experiments were carried out on an Alpha Technologies APA2000 rheometer (Alpha Technologies Inc., Bellingham, Wash.), which is a "moving die" parallel plate rheometer having an upper plate and a lower plate. Infusing comprised applying downward pressure via a pneumatically-actuated upper plate to a resin-carbon fiber fabric specimen within a die chamber equipped with an o-ring seal (epoxy-resistant EPDM-containing o-rings, size 2-129, compound EP692-45, Zatkoff Seals, Saginaw, Mich.) to prevent resin outflow while allowing air (gas) to escape the die chamber as the upper plate travels downward. In the rheometer, downward travel of the upper plate both compresses the specimen and infuses resin into the fabric.

The following materials were used to make the specimen: 50 micron (2 mil)×5.12 cm in diameter plastic release film sheets; die-cut 39.35 mm diameter red silicone rubber backing disks, 0.79 mm thickness; masking tape, 50 micron (2 mil) thickness, die cut into 5.12 cm (2") diameter disks, with a 2.24 cm (⅞") diameter center punch removed; and die-cut 37.9 mm disks of 590 g/m² non-crimp fabric (NCF) (+60°/−60°/0° layup; normal stitch; DowAksa AKSA CA A42 24K fiber; NCF product code=DMC4620305, from Sigmatex Carbon Textile Solutions, Inc., Orangeburg, S.C.).

Infusion was performed with the rheometer set at a plate temperature of 60° C., wherein, a dry layup, including one NCF disk on a bottom silicone rubber backing disk and at bottom a release film sheet, was carefully centered on the bottom plate of the rheometer and heated for 2 min to bring the fabric to temperature. Then, 0.8 g of the thermosetting resin mixture indicated in Table 2, below, was applied onto the center of the exposed fabric and a sheet of the release film was laid on top of the resin and pressed gently to improve thermal contact for heating the resin. A silicone rubber backing disk was placed on top of the layup. After 30 seconds to preheat the resin mixture, the button was pushed to lower the upper plate and close the die and a 2 min countdown timer was started. Because fully closing the die takes about 15 sec at line pressure of 137.9 kPa (20 psig), the actual hold time at full pressure was less than 2 min. Last, the die was opened after the 2 min timer went off and the sample was promptly removed from the heated plate to cool.

Test Methods: The following tests were performed:

Differential Scanning calorimetry: Unless otherwise indicated, determined as defined above.

Determination of Cured Tg: 10 grams of each of the indicated thermosetting resin mixtures prepared as described in Example 1B, above, were poured into aluminum weighing pans, and cured in an oven set at 150° C. for 3 minutes. The cured samples were then removed from the oven, cooled to room temperature after which ~5 mg pieces were cut from each sample and tested using DSC to measure the cured Tg of the samples. The results are shown for Examples 3 and Comparative Example 3 in Table 3, below.

Tg development of prepreg at room temperature: The prepreg Examples were stored at ambient temperature. Samples were cut at regular time intervals from the prepreg and tested using DSC to follow the Tg1 development of the prepregs over a period of 1 month. The results are shown in Table 4, below for the prepregs of Examples 4 and Comparative Example 4, which are, respectively, made from the thermosetting resin mixtures in Examples 3 and Comparative Example 3.

The data in Table 2, below, shows that for thermosetting resin mixtures made as in Example 1B, above, an epoxy amine adduct will dissolve a greater amount of dicyandiamide in a smaller equivalent weight of amine.

TABLE 2

Solubility of Dicyandiamide in Cycloaliphatic Amine vs. Epoxy Amine Adduct

| Example | Comparative Example 3 | Example 3 |
|---|---|---|
| Total Epoxy Resin* | 88.5 | 87.82 |
| MDACH | 7.0 | |
| MDACH-Epoxy Resin 1 adduct | | 7.35 |
| Dicyandiamide | 1.85 | 2.20 |
| Urea catalyst | 2.65 | 2.63 |

TABLE 2-continued

Solubility of Dicyandiamide in Cycloaliphatic Amine vs. Epoxy Amine Adduct

| Example | Comparative Example 3 | Example 3 |
|---|---|---|
| Total | 100.00 | 100.00 |
| AHEW of MDACH/MDACH-LER adduct | 32 | 37.6 |
| % dicy dissolved in amine | 21 | 24 |
| Equivalents of MDACH/MDACH-LER per 1 equivalent of epoxy | 0.44 | 0.40 |

*In Table 2, above, the Epoxy Resin comprises an 80/20 w/w mixture of Epoxy Resin 1 and Epoxy Resin 2.

In the formulation of Example 3, at least 15% more dicyandiamide was dissolved in solution than in Comparative Example 3.

TABLE 3

Cured Tg (Post cured for 3 min at 150° C.)

| Example | Tg2 (° C.) |
|---|---|
| Comparative Example 3 | 148 |
| Example 3 | 153.6 |

As shown in Table 3, above, a comparison of the thermosetting resin mixtures of the present invention versus the same resin mixture in Comparative Example 3 without the epoxy-amine adduct, the Example 3 thermosetting resin mixture has a higher cured of Tg>150° C.

TABLE 4

Prepreg Tg Development at Ambient Temperature

| | Tg1 (° C.) | |
|---|---|---|
| Example | Day 17 | Day 27 |
| Comparative Example 4 | 30.6 | 32.2 |
| Example 4 | 26.2 | 27.1 |

The Initial Tg of the prepregs made from the formulation in Comparative Example 4 was ~30-31° C. after two weeks, and stabilized at around 32-33° C. after nearly a month at ambient room temperature. The Tg1 of the prepreg from inventive formulation (Example 4) was about 5° C. lower under similar aging conditions.

We claim:

1. A thermosetting resin pre-impregnated fiber material or prepreg comprising a fiber material of a heat resistant fiber infused with a thermosetting resin mixture comprising (i) at least one liquid epoxy resin, (ii) at least one epoxy novolac resin, (iii) dicyandiamide, and (iv) an adduct of a cycloaliphatic amine and a liquid epoxy resin, wherein the dicyandiamide is dissolved in the adduct of a cycloaliphatic amine and a liquid epoxy resin wherein the (iv) adduct of a cycloaliphatic amine and a liquid epoxy resin comprises the adduct of the liquid epoxy resin and a mixture of 4-methylcyclohexane-1,3-diamine and 2-methylcyclohexane-1,3-diamine (MDACH).

2. The thermosetting resin pre-impregnated fiber material or prepreg as claimed in claim 1, wherein the fiber material comprises a continuous fiber, a woven mat, or chopped or recycled fibers.

3. The thermosetting resin pre-impregnated fiber material or prepreg as claimed in claim 1, wherein the fiber material or prepreg has an initial (DSC) glass transition temperature (Initial Tg) of 40° C. or below, and, further wherein the ratio of amine hydrogen equivalents in the (iv) adduct of a cycloaliphatic amine and a liquid epoxy resin to the epoxy group equivalents in the (i) at least one epoxy resin and (ii) at least one novolac resin is from 0.25:1 to 0.45:1, and, yet further wherein, the ratio of amine hydrogen equivalents of the (iii) dicyandiamide to the total epoxy group equivalents in the (i) at least one epoxy resin and the (ii) at least one epoxy novolac resin ranges from 0.20:1 to 0.75:1.

4. The thermosetting resin pre-impregnated fiber material or prepreg as claimed in claim 1, wherein the fiber material or prepreg has a shelf life of at least 30 days at ambient temperature and pressure before its Initial Tg rises above 40° C.

5. The thermosetting resin pre-impregnated fiber material or prepreg as claimed in claim 1, further comprising one or more catalysts in amounts of from 1 to 8 phr, and wherein alter curing for 3 minutes at 150° C., the resulting material has a cured Tg of 150° C. or greater.

6. The thermosetting resin pre-impregnated fiber material or prepreg as claimed in claim 5, wherein the one or more catalyst comprises an alkylaryl or phenyl substituted urea.

7. The thermosetting resin pre-impregnated fiber material or prepreg as claimed in claim 1, wherein the continuous fiber material comprises a heat resistant fiber chosen from carbon fiber, glass fiber, ceramic fiber, acrylonitrile fibers, aramid fibers, or their admixtures.

8. A method for making a thermosetting resin pre-impregnated fiber material or prepreg comprising:

infusing at ambient temperature a fiber material of a heat resistant fiber with a thermosetting resin mixture comprising (i) at least one liquid epoxy resin, (ii) at least one epoxy novolac resin, and a solution of (iii) dicyandiamide in (iv) an adduct of a cycloaliphatic amine and a liquid epoxy resin, the thermosetting resin mixture having a differential scanning calorimetry (DSC) initial glass transition temperature (Initial Tg) of 40° C. or below, wherein the ratio of amine hydrogen equivalents in the adduct of a cycloaliphatic amine and a liquid epoxy resin to the epoxy group equivalents in the (i) at least one epoxy resin and the (ii) at least one epoxy novolac resin ranges from 0.25:1 to 0.45:1; yet further wherein, the ratio of amine hydrogen equivalents of the (iii) dicyandiamide to the total epoxy group equivalents in the (i) at least one epoxy resin and the (ii) at least one epoxy novolac resin ranges from 0.20:1 to 0.75:1, and, then, B-staging the resulting material by heating it at a temperature of from 80 to 110° C. for a period of 30 seconds to 4 minutes to advance the Initial Tg of the thermosetting resin pre-impregnated fiber material or prepreg to a temperature of 40° C. or below.

* * * * *